3,021,223
PROCESS FOR INCREASING BULK DENSITY OF POTATO FLAKES
Roderick K. Eskew, Glenside, Pa., assignor to the United States of America as represented by the Secretary of Agriculture
No Drawing. Filed Sept. 13, 1960, Ser. No. 55,807
5 Claims. (Cl. 99—207)
(Granted under Title 35, U.S. Code (1952), sec. 266)

A non-exclusive, irrevocable, royalty-free license in the invention herein described, through the world for all purposes of the United States Government, with the power to grant sublicenses for such purposes, is hereby granted to the Government of the United States of America.

This application is a continuation-in-part of patent application Serial No. 15,467, filed March 16, 1960, which in turn, is a continuation-in-part of patent application Serial No. 858,833, filed December 10, 1959, both of which are now abandoned.

This invention relates to a process for increasing the bulk density of potato flakes by manipulation while in a moist state.

Potato flakes may be defined as mashed potatoes prepared so as to minimize cell breakage, dehydrated in sheet form to less than about 20% moisture on a single or double drum drier and then fragmented to convenient size. In a preferred but not essential procedure for preparing potato flakes this process entails drum drying mashed potatoes substantially as described in U.S. Patent No. 2,787,553 and in co-pending application, Serial No. 790,983. Potato flakes are now widely made commercially and are of excellent quality but possess the drawback of bulkiness. Normally they have a package density of about 15 pounds per cubic foot. This can be increased at most to about 30 pounds per cubic foot by grinding the substantially dry flakes. Finer grinding ruptures too many potato cells and destroys body so that on reconstitution an unpalatable pasty or pudding-like mashed potato results. In the inventive process this one dissadvantage of flakes is overcome and there is obtained a dehydrated free-flowing product the character and appearance of which will be determined largely by the moisture content of the fragmented flakes when they are manipulated, as will hereafter appear.

An object of the invention is to increase the bulk density of potato flakes thereby reducing packaging costs and enabling inert gas packing. Such packing minimizes or eliminates the necessity for the use of artificial antioxidants in the product. Another object is to provide a means for reducing potato flakes to very small size without occasioning excessive cell rupture with consequent impairment in texture of the reconstituted product. A further object is to provide, during manipulation in a moist state, a convenient means for incorporating milk, butter or other appropriate ingredients to yield a product which by merely reconstituting with water will yield mashed potato ready for eating. Moreover, emulsifiers such as monoglycerides, for example, glycerolmonopalmitate or glycerolmonostearate, may be added here to improve the texture and abuse tolerance of the reconstituted mashed potato. Other objects and a better understanding of the invention may be had by referring to the following description, examples and claims.

In general, according to the present invention, potato flakes having a moisture content in the range of about 5 to 20% and a bulk density from about 5 to 30 pounds per cubic foot are hydrated to a moisture content from about 25 to 50%, the hydrated flakes are mechanically manipulated to achieve the desired form and are then dried to a moisture content of from about 5% to 8% to produce a product having a bulk density from about 35 to 58 pounds per cubic foot.

I have discovered that when potato flakes are hydrated to a moisture content of between about 25–50% they can be subjected to mechanical action which separates them into smaller pieces by cleavage primarily between individual cells rather than by fracture of cell walls. If the mechanical action is applied at a moisture range between about 36 and 45% the cells may separate substantially completely into individual cells or small clusters thereof so that the identity of the flake is lost. Such a product when dried may have a bulk density between about 50 and 57 pounds per cubic foot. On the other hand if the moisture range during manipulation is between about 25 and 35% the flakes may not lose their identity. Some separation into individual cells or small cell clusters may occur but in the main the dry product will consist of flakelets mostly smaller in size than before hydration. Some may be aggregated, laminated, or slightly curled which with the interstitial flake fragments and individual cells will contribute an increase in bulk density above that possessed by the flakes before treating by the inventive process. Operation in this lower moisture range results in a product possessing the desirable flavor and texture properties of the initial flakes, at the same time retaining the appearance of very small flakes or flakelets yet possessing a relatively high bulk density.

The flakes may be hydrated with water or with edible. water-containing materials such as milk or mashed potatoes to achieve the desired moisture range and then mixing to provide friction to fragment the moist flakes and to separate cells without cell breakage. The preferred way is to achieve the desired moisture range by mixing potato flakes with freshly cooked potatoes in piece or mashed form.

The flakes to be hydrated, for example by adding to cooked slabs, need not be dried to the customary 5 or 6% moisture. They should, however, contain less than about 20% moisture. Equilibration of moisture between the undried potatoes and flakes is facilitated by small flake size. The flakes before hydration should not be broken to so small a size as to impair texture of the finished product nor should they be so large as to require long periods for moisture equilibration. A preferred range is that resulting from grinding the sheet through holes between 1/16″ and 1/8″ in diameter.

Although flakes such as are currently used in commerce, having for example a bulk density between about 15 and 30 pounds per cubic foot, depending on size, may be used for this process, the preferred method when manipulating in a moisture range of about 36–45%, is to prepare flakes of low bulk density, for example, having a bulk density between about 5 and 15 pounds per cubic foot. These can advantageously be made using a double drum drier or by operating a single drum drier at higher speeds than used in making the denser flakes of commerce. For example the single drum operated at 4 r.p.m. instead of 2 r.p.m. will give a sheet with a density of about 1.65 pounds per 100 square feet instead of about the 2.25 pounds per 100 square feet typically obtained with 2 r.p.m. These are typical values where potatoes of about 20% solids are used. The lighter sheet can be broken into fluffy flakes with a bulk density in the preferred range. Moreover, the higher drum speed will greatly increase drum drier capacity.

The foregoing statements as to the advantages of hydrating flakes from sheets of low density obviously apply primarily to the situation in which hydration is to be in the range of about 36 to 45% where flake identity will be lost. In contrast, flakes from a high density sheet should be employed if hydration is to be done in the range of about 25–35% to obtain a product wherein flake-like appearance is to be retained in the final product.

The mechanical manipulation to which the hydrated flakes are subjected can be achieved by a variety of machines. Its function is to facilitate equilibration of the hydrating medium with the flakes to be hydrated and to supply a gentle rubbing and tossing action to induce cell separation with the minimum cell fracture. This can be accomplished in continuous mixers of the ribbon or pug mill type or it can be done batchwise in a planetary mixer of the type commonly employed in restaurants. Any apparatus contributing the specified action may be used. The time required for manipulating the moist product will vary with the machine employed, the product desired, the variety of the potatoes, and other factors. For example, if the product is hydrated to the range of 36–45% and substantially complete separation of cells is desired, the manipulating time can be shortened if instead of carrying it to completion the moist product is separated by air classification or by sieving, for example, through a 20-mesh sieve. The larger pieces may then be brushed through a screen with holes approximately .023" diameter to give substantially individual potato cells. These are combined with the material passing through the 20-mesh sieve and the mixture is dried. In the moisture range of between 36 and 45%, the total cycle for moist manipulation and/or holding may be as short as 60 minutes, as in Example I where granulation is not carried to completion, or even shorter. Alternatively it may be as long as 2½ hours as in Example II where granulation was carried to substantial completion. However, when operating in the 25 to 35% moisture range, the cycle can be shorter, for instance in Example VI where 45 minutes' mixing with no holding period was sufficient. Under some circumstances even shorter mixing may suffice in this moisture range.

Drying of any of the products of this invention may be accomplished by any conventional means such as air lift and/or fluidized bed drying.

Some examples of how the inventive process may be carried out are as follows:

*Example I*

Russet Burbank potatoes containing 21.4% solids were lye peeled and trimmed in a conventional manner. They were then sliced to ½" slabs and precooked in water at 160° F. for 20 minutes, followed by cooling in water at 35° F. for 30 minutes to retrograde soluble amylose. The slabs were then steamed at atmospheric pressure for 30 minutes. These were divided into two parts, one to be made into flakes and the other to be employed as shown later. The flakes were prepared as follows: The cooked slabs were riced and there was incorporated an emulsion of glycerol monopalmitate and butylated hydroxyanisole and butylated hydroxytoluene in water to give the equivalent of 0.3% glycerol monopalmitate and 100 p.p.m. each of butylated hydroxyanisole and butylated hydroxytoluene on the solids in the mash. A solution of $NaSO_3$ and $NaHSO_3$ was incorporated into the riced material to give 400 p.p.m. equivalent $SO_2$ based on solids in the mash. This was dried on a single drum drier operated at 4 r.p.m. and employing steam in the drum at 55 pounds per square inch. The sheet of product was cut in a sharp-knife hammermill through holes of ⅛" diameter. The flakes contained 7.5% moisture. In order to obtain material of higher density, the flakes prepared as above were mixed with the previously prepared slabs of cooked potatoes using a planetary mixer operated at 100 r.p.m. The proportions were calculated to give 40% moisture. There was added to this enough solid glycerol monopalmitate to bring the total in the mix to 1.0% on the basis of potato solids present. Mixing was for 3 minutes followed by 30 minutes holding with 10 second stirrings at 10 minute intervals. The container was covered during this period. The cover was then removed and agitation was continuous for 30 minutes.

During the entire 60 minutes holding and mixing period the temperature dropped from 150° F. to 70° F. and the moisture from 40% to 36%.

The mixture was sieved through a 20-mesh vibrating sieve. The oversize aggregates which separated were forced through a rotary screen having holes .023" diameter to subdivide them. This screened material was combined with that passing through the sieve and the entire product was dried to 12% moisture in an airlift drier at 250° F. and air velocity of 2000 feet per minute. The 12% moisture product was further dried in a fluidized bed drier to 6% moisture.

The product from the foregoing example had a density of 56 pounds per cubic foot. All of it passed a 30-mesh screen and 80% passed 50-mesh. The entire product could be reconstituted with hot water and milk to a product of good flavor and texture. Products having similar attributes may also be made by other means as illustrated in Examples II, III, IV and V.

*Example II*

Same as Example I except:
(a) Standard flakes of commerce were used, cut to ⅛" before mixing with hot cooked slabs.
(b) Proportions of flakes and slabs were such as to give an average of 42% moisture.
(c) Mixing was for 30 minutes in an open container.
(d) After mixing, the mixture was held at room temperature for 2 hours.
(e) After this mixing and holding, the mixture was given a 3-minute fluffing mix.
(f) The entire product was dried without sieving or screening.

*Example III*

Same as Example I except:
(a) The flakes and cooked potato slabs were mixed in proportions to give 38% moisture.
(b) Equilibration was done in a covered container kept at a temperature range between 150° and 160° F.

*Example IV*

Same as Example I except:
(a) The flakes were hydrated to the desired 40% moisture using a fine spray of water at 170° F. instead of by adding hot cooked potato slabs.
(b) The glycerol monopalmitate added to the moist mixture of hydrated flakes was in the form of an aqueous emulsion instead of in solid form.

*Example V*

Same as Example I except:
(a) Precooking and cooling of the slabs were not used in preparing the mashed potatoes.
(b) The glycerol monopalmitate added to the moist mixture of flakes and slabs was in the form of an aqueous emulsion and the amount added was sufficient to bring the total glycerol monopalmitate in the mix to 3.0% on the basis of total potato solids present.
(c) The mixing time in the uncovered container was 60 minutes instead of 30 minutes.

*Example VI*

Same as Example I except:
(a) California White Rose potatoes of 19% solids were used.
(b) Steaming at atmospheric pressure was for 40 minutes instead of 30 minutes.
(c) 0.7% glycerol monostearate was added in preparing the flakes instead of 0.3%.
(d) The slabs of cooked potatoes were cooled to 80° F.
(e) The proportions of flakes and cooked slabs were such as to give a mix moisture of 28% instead of 40%.
(f) No extra glycerol monoglyceride was added to the moist mixture.
(g) The total cycle in the moist state consisted of mechanical manipulation for 45 minutes in an uncovered bowl of a planetary mixer.

(h) The moist product was dried without sieving or screening.

The product from this example consisted primarily of very small flakes. It had a bulk density of 43 pounds/cubic foot and 99% of it passed a 12-mesh screen. This could be reconstituted in 2 minutes to a mash of good consistency and flavor using hot water and milk.

*Example VII*

Same as Example VI except:
(a) The proportions of flakes and cooked slabs were such as to give 31% moisture instead of 28%.
(b) Sufficient dry skim milk solids ("instantized" type) were added after 40 minutes mixing to give 0.16 pound of milk solids for each pound of potato solids present.
(c) Bulk density of the dried product was 52 pounds per cubic foot. 98% passed a 12-mesh screen and could be reconstituted in 2 minutes with hot water to give a mashed potato of good flavor and texture.

I claim:

1. A process comprising hydrating potato flakes to a moisture content of about from 25 to 35% with a hydrating medium, manipulating the hydrated potato flakes to produce aggregates and laminates thereof, thereby to thicken them and increase their bulk density, and drying the thus-thickened flakes to obtain dehydrated flakes having a bulk density of about from 35 to 52 pounds per cubic foot.

2. The process of claim 1 wherein the hydrating medium comprises an edible, water-containing material.

3. The process of claim 1 wherein the hydrating medium comprises cooked potatoes.

4. The process of claim 1 wherein the hydrating medium comprises water.

5. The process of claim 1 wherein the potato flakes initially hydrated have been prepared by a process which included precooking and cooling the potatoes to retrograde soluble amylose.

References Cited in the file of this patent

Cording et al.: Potato Flakes, ARS 73–25, July 1959, pp. 15–18.

Olson et al.: "Recent Advances in Potato Granule Technology," located in "Food Technology," 1953, pp. 177–180.